Feb. 10, 1925.  
W. A. SO RELLE  
1,525,670  
COTTON PICKER  
Filed April 13, 1923  
3 Sheets-Sheet 1
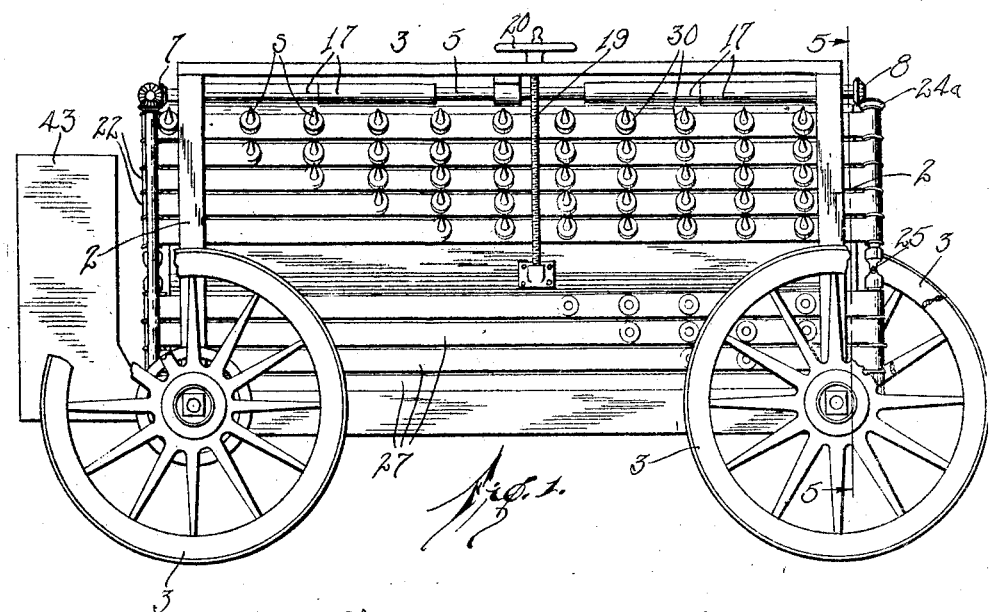
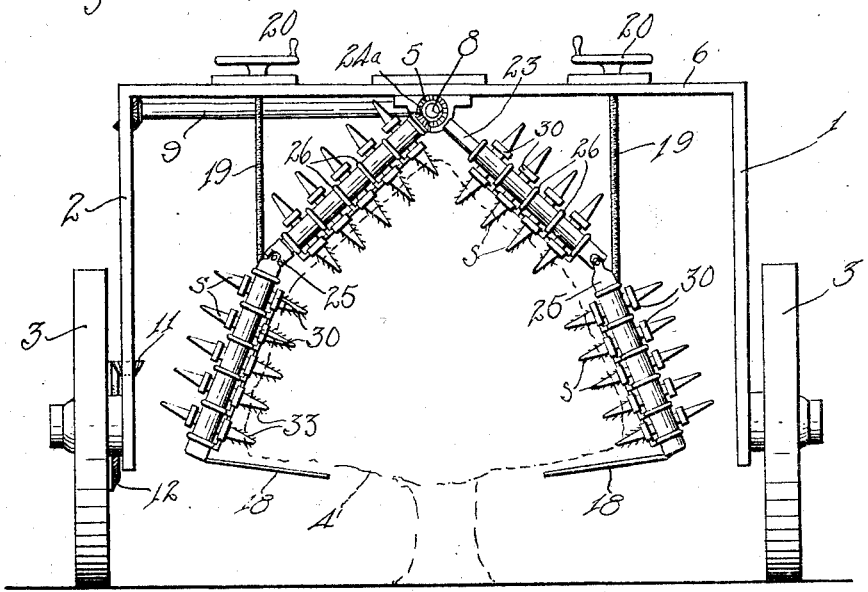

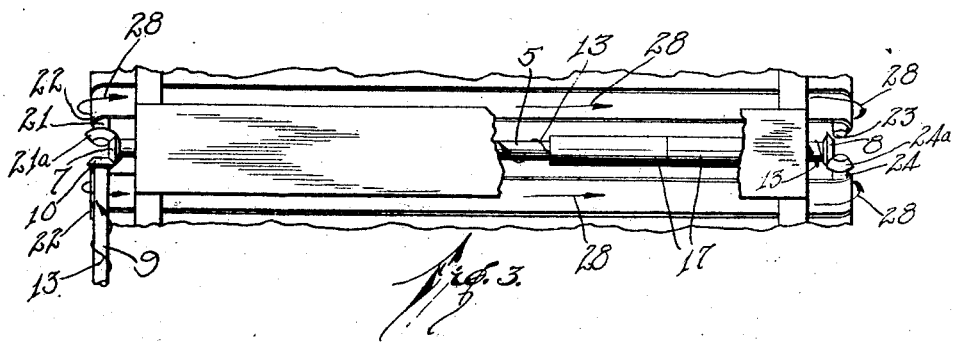
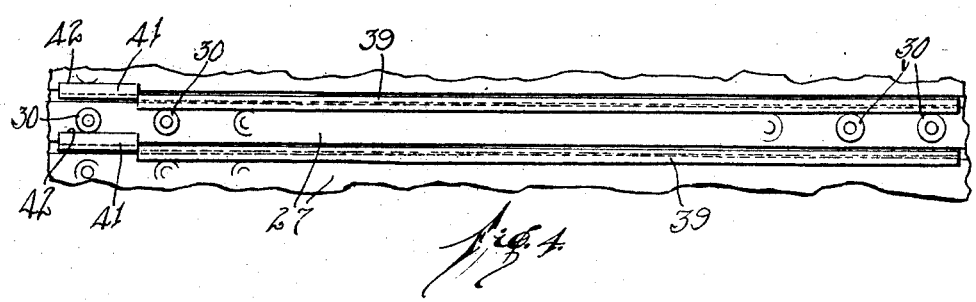
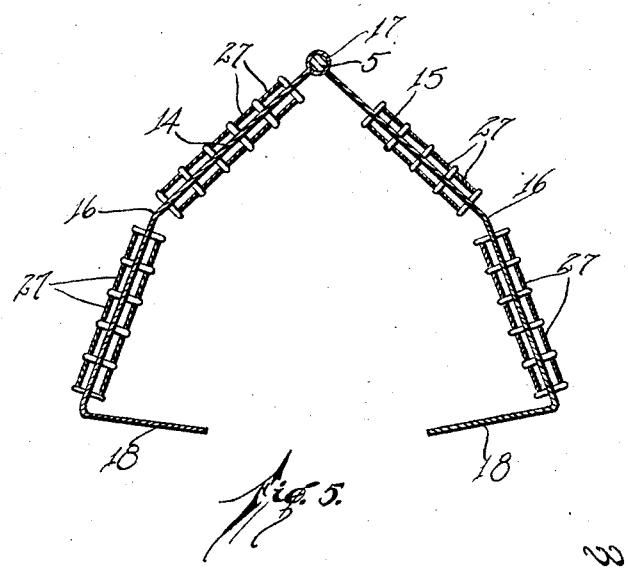

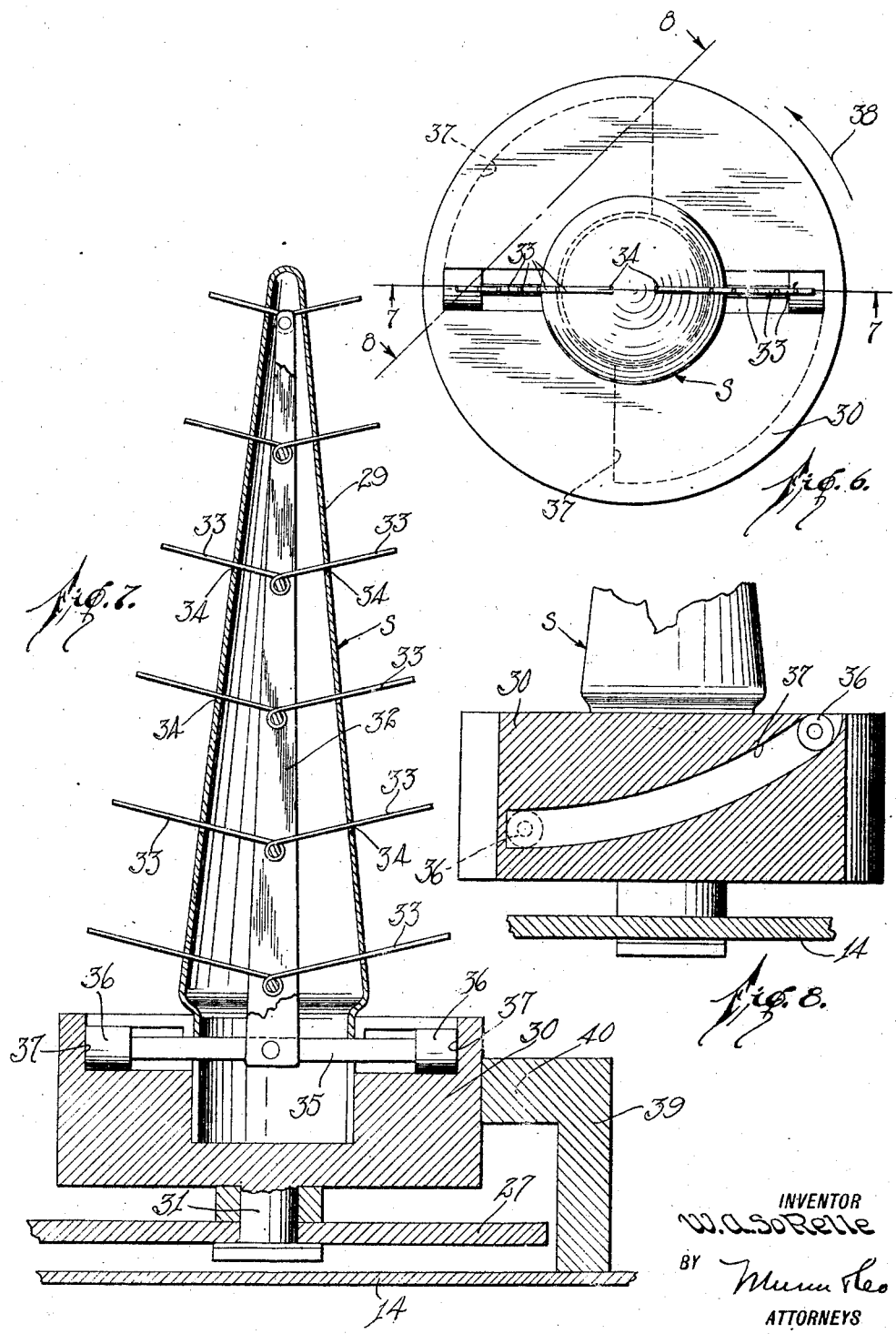

Patented Feb. 10, 1925.

1,525,670

UNITED STATES PATENT OFFICE.

WILLIAM A. SO RELLE, OF CLARENDON, TEXAS.

COTTON PICKER.

Application filed April 13, 1923. Serial No. 631,880.

*To all whom it may concern:*

Be it known that I, WILLIAM A. SO RELLE, a citizen of the United States, and a resident of Clarendon, in the county of Donley and State of Texas, have invented a new and useful Improvement in Cotton Pickers, of which the following is a full, clear, and exact description.

My invention relates to improvements in cotton pickers, more particularly to that type of cotton picker which is moved along the row of cotton plants, and automatically removes the cotton bolls therefrom, and it consists in the combinations, constructions, and arrangements herein described and claimed.

An object of my invention is to provide a cotton picker of the character described which is entirely automatic in its operation, and which necessitates the mere drawing of the carriage upon which the picker is mounted over the rows of cotton plants.

A further object of my invention is to provide a cotton picker of the type described having a novel means for engaging with the cotton on the plant and for releasing the cotton and subsequently discharging the cotton into a suitable hopper.

A further object of my invention is to provide a cotton picker of the character described which is capable of adjustment laterally to accommodate cotton plants of various sizes.

A further object of my invention is to provide a cotton picker of the character described that is highly efficient in operation, that is durable in construction, and that is thoroughly practical commercially.

Other objects and advantages will appear in the following specification, and the novel features of the invention will be particularly pointed out in the appended claims.

My invention is illustrated in the accompanying drawings forming part of this application, in which—

Figure 1 is a side elevation of an embodiment of my invention, portions thereof being broken away, Figure 2 is a front elevation of the mechanism illustrated in Figure 1, Figure 3 is a partial elevation of the mechanism illustrated in Figure 1, Figure 4 is a part of a bottom view of the mechanism illustrated in Figure 1, Figure 5 is a sectional view along the line 5—5 of Figure 1, Figure 6 is an enlarged top plan view of one of the cotton engaging spindles, Figure 7 is a sectional view along the line 7—7 of Figure 6, and Figure 8 is a sectional view along the line 8—8 of Figure 6.

In carrying out my invention I make use of a carriage 1 having a substantially U-shaped retaining frame 2, mounted upon four carriage wheels 3. The retaining frame 2 is U-shaped so that it may pass over a row of cotton plants, such as indicated in dotted lines at 4.

The carriage 1 is provided with a central drive shaft 5 rotatably supported upon the horizontal members 6 of the retaining frame 2. The drive shaft 5 is provided with bevel gears 7 and 8 at the opposite ends thereof. Means for driving the shaft 5 when the carriage is moved along the rows is provided in a shaft 9 having a bevel gear 10 at one end thereof that is in engagement with the bevel gear 7 on the shaft 5. The opposite end of the shaft 9, (see Figure 2) is also provided with a bevel gear 11. A relatively large bevel gear 12 is carried upon the inner face of one of the carriage wheels 3 and is in mesh with the bevel gear 11 so that as the carriage is moved along the rows, the wheels 3 will rotate and cause the drive shaft 5 to turn in the direction of the arrows 13.

An adjustable V-shaped metal casing is constructed of two parts 14 and 15, each bent laterally at 16 and is hingedly mounted at 17 upon the shaft 5, (see Figures 3 and 5). The outer or lower ends of the members 14 and 15 of the casing are bent inwardly as shown at 18, so that these portions may underlie the lowermost branches of the cotton plant.

Means for adjusting the members 14 and 15, that is spreading these members apart from one another, or moving them toward one another, is provided in a pair of jack screws 19 having hand wheels 20 at the upper end thereof, and having their lower ends secured to the members 14 and 15 respectively. Movement of the hand wheels 20 will cause the jack screws to rise and lower relative to the horizontal portions 6 of the retaining frame 2, and cause a proportional movement of the members 14 and 15. The purpose of the housing consisting of the members 14 and 15 is to support thereupon the mechanism for engaging with the cotton bolls on the plant as the device is moved over the cotton rows. Means for driving this mechanism from the drive shaft 5 is provided in a plurality of shafts 21, 22, 23, and 24. Each of the shafts 21 to 24 inclusive consists of two parts joined to one another by a universal joint 25. These shafts are mounted in registration with the ends of the members 14 and 15.

Each of the shafts 21 to 24 inclusive has a plurality of discs 26 arranged at regular intervals along the axis thereof. The purpose of these discs is to separate a plurality of moving belts 27 which are disposed so as to encompass the members 14 and 15 longitudinally and to ride upon the shafts 21 to 24 inclusive.

The shafts 21 and 24 are each provided with bevel gears 21$^a$ and 24$^a$ respectively, which gears are in mesh with the gears 7 and 8 respectively, so that as the shaft 5 is turned, the belts 27 disposed upon the shafts 21 to 24 inclusive will move in the direction of the arrows 28.

Each of the belts 27 has a plurality of cotton engaging spindles generally indicated at 8 rotatably mounted thereupon at regular intervals along the length of the belts. These cotton engaging spindles consist, as reference to Figures 6, 7, and 8 will show, of a substantially conical hollow spindle 29 which is supported upon an especially constructed cam wheel 30. The spindle 29 is arranged so that it may turn on its axis relative to the cam 30. The cam 30 is rotatably supported directly upon the belt 27 by means of screws 31. In Figure 7 the belt 27 is shown at a short distance from the metal sheeting of the member 14 which is precisely as the device would look while in operation.

The spindle 29 has a central strip 32 disposed longitudinally therein, upon which is pivotally supported a plurality of wire bristles 33 arranged to project through openings 34 in the spindle 29. The lower end of the strip 32 has a transverse shaft 35 secured thereto. The outer ends of the shaft 35 are provided with rollers 36. The rollers 36 are disposed within arcuate cam slots 37, (see Figures 6 and 8) so that as the cam wheel 30 is rotated in the direction of the arrow 38, the shaft 35 will be pulled downwardly and the bristles 33 will be drawn into the spindle 29 to release any cotton that has been held in engagement therewith.

When the cam member 30 is rotated in the opposite direction of the arrow 38, the bristles 33 will be forced outwardly to engage the cotton.

Each of the belts 27 has disposed in parallel relation thereto, an L-shaped cam strip 39, (see Figures 4 and 7). The strips 39 are supported directly upon the members 14 and 15 respectively, and extend for the major portion of the length of the belts 27 on the inner surface of the members 14 and 15. That portion of the members 39 parallel to the belts 27 and indicated at 40 is arranged so that its outer edge contacts the outer surface of the cam member 30 in such a manner as to cause the cam member to rotate relative to the members 14 and 15, thereby causing the spindle 29 to turn also. If the cam member 30 is caused to turn in the direction of the arrow 38, the bristles 33 will be drawn inwardly of the spindle 29, but if the cam 30 is caused to turn in the opposite direction of the arrow 38, the bristles will be forced out. The cam strips 39 are so arranged that while the carriage is drawn in a forward direction of the ground, the cam wheels 30 will turn in the opposite direction from the arrow 38, and therefore will engage with any cotton bolls which are upon the plants 4. It should be noted at this point that the spindle 29 will continuously turn as long as the cam member 30 is in engagement with the portion 40 of the strip 39. That portion of the members 14 and 15 immediately adjacent the rear of the carriage 1 is provided with cam strips 41 similar to the cam strips 39, but having their portions 42 which correspond with the portions 40 of the cam 39 facing in the opposite direction, so that the direction of rotation of the cam members 30 will be in the direction of the arrow 38 when the belts 27 have moved so as to bring the cams 30 in engagement with the members 41 and out of engagement with the members 39. This sudden reversal of the cam member 30 and accompanying reversal of the direction of the spindle 29, together with the fact that the bristles 33 will be drawn within the spindle 29 will cause the cotton bolls which are then engaged with the spindle to be suddenly released and thrown into a hopper indicated at 43 in Figure 1.

From the foregoing description of the various parts of the device, the operation thereof may be readily understood. It should be noted at this time that the operation of my improved cotton picker is entirely automatic save for the drawing of the device over the cotton rows as shown in Figure 2. As the wheels 3 turn in the movement of the carriage along the rows, the bevel gear 12 will cause the shaft 9 to turn and drive the shaft 5. The shaft 5 is directly connected by means of the bevel gears 7 and 8 to the shafts 21 to 24 inclusive upon which the belts 27 are mounted. Therefore the belts 27 will move relative to the carriage but will not move relative to the plants. Each of the spindles 29 upon the belts 27 that are in the inner side of the members 14 and 15 will rotate, and the bristles 33 will engage with the bolls of cotton upon the plants.

The cotton will remain upon the spindles until the cam members 30 have moved into engagement with the strips 41 and out of engagement with the strips 39, whereupon the cotton will be hurled directly into the hopper 43.

Let us assume that the plants are somewhat larger in diameter than the plants shown in Figure 2. In this event the operator will actuate the hand wheels 20 and cause the members 14 and 15 to be spread apart from one another to encompass a larger plant. Likewise, the hand wheels 20 may be manipulated to bring the members 14 and 15 toward one another, so that the spindles 29 may be properly aligned with the exterior portions of the smaller plant.

One of the important advantages of my present invention is that the multiplicity of spindles 29 which are constantly rotating on the under sides of the members 14 and 15 do not miss any of the cotton bolls upon the plants, but are moved into engagement with the entire cotton bearing surfaces of the plant. The bristles 33 have a tendency to instantly engage with the cotton and to cause the cotton to be wound around the spindles, where it will stay until the spindle is rotated in the opposite direction, and the bristles withdrawn. This construction virtually brings about a separation of the cotton from the leaves, and other portions of the plant, which, in the ordinary cotton picker, are likely to become removed with the cotton.

I claim:

1. A device of the character described comprising a carriage having wheels whereby said carriage may be moved on its wheels over a row of cotton plants, a plurality of endless belts disposed longitudinally and parallel with one another upon said carriage, means for driving said belts, means for moving said belts laterally and vertically simultaneously, whereby said belts may be moved to lie close to said cotton plants and to accommodate plants of various sizes, and means associated with and driven by said belts for engaging with the cotton on said plants, whereby cotton may be removed from said plants.

2. A device of the character described comprising a carriage having wheels whereby said carriage may be moved on its wheels over a row of cotton plants, a pair of frames pivotally mounted upon said carriage and having the axis of their pivotal connection at the mid point of said carriage and extending longitudinally thereof, said frames being angular in vertical cross section whereby the inner walls of said frames when spread apart from one another at their pivotal support may lie close to the outer portions of the cotton plant when the carriage is moved thereover, manually operated means for elevating and lowering said frames on their pivotal support whereby said frames may be moved both vertically and laterally relative to said plant, a plurality of endless belts disposed longitudinally on said frame, means for driving said belts associated with the wheels of said carriage and means associated with and driven by said belts for engaging with the cotton on said plants whereby said cotton may be removed from said plants.

WILLIAM A. SO RELLE.